(12) United States Patent
Alli

(10) Patent No.: US 6,585,188 B2
(45) Date of Patent: Jul. 1, 2003

(54) RESCUE VEHICLE

(75) Inventor: Pietro Alli, Cerro Maggiore (IT)

(73) Assignee: Agusta S.P.A. (IT)

( * ) Notice: Subject to any disclaimer, the term of this patent is extended or adjusted under 35 U.S.C. 154(b) by 0 days.

(21) Appl. No.: 10/116,789

(22) Filed: Apr. 4, 2002

(65) Prior Publication Data
US 2002/0171009 A1 Nov. 21, 2002

(30) Foreign Application Priority Data
Apr. 4, 2001 (IT) .................................. TO2001A000327

(51) Int. Cl.$^7$ ............................ B64D 11/00; B64D 13/00
(52) U.S. Cl. .............................. 244/118.5; 244/118.6; 244/122 R; 244/137.1; 244/137.2; 296/69; 296/65.1; 296/19; 296/67; 296/236
(58) Field of Search ............................ 244/17.11, 17.15, 244/117 R, 118.1, 118.2, 118.5, 118.6, 122 R, 122 AG, 122 AH, 122 B, 137.1, 137.2, 140, 141, 147

(56) References Cited

U.S. PATENT DOCUMENTS 4,178,032 A * 12/1979 Hone ........................ 296/19
5,490,703 A * 2/1996 Hewko ....................... 303/82
5,562,264 A * 10/1996 Bietenhader ................ 244/120
5,615,848 A * 4/1997 Ceriani ..................... 244/118.5
5,738,306 A * 4/1998 Moss et al. ............... 244/137.2
5,785,277 A * 7/1998 Manning et al. .......... 244/137.2
6,779,296    7/1998 Hewko
5,950,964 A * 9/1999 Saggio et al. ............. 244/118.1

FOREIGN PATENT DOCUMENTS

DE      809 947 A       5/1951
FR      2 636 523 A1    3/1990

* cited by examiner

Primary Examiner—Charles T. Jordan
Assistant Examiner—Stephen A Holzen
(74) Attorney, Agent, or Firm—Akerman Senterfitt

(57) ABSTRACT

A rescue vehicle having a compartment for receiving a movable stretcher having two mushroom-shaped pins located at a front end and a rear end respectively of the stretcher. The compartment has a lateral opening for passage of the stretcher, and which is narrower than the length of the stretcher; a click-on lock unit located at one end of the compartment, such end facing the lateral opening, and for locking a first of the two pins; and a guide unit, which is set back with respect to the lateral opening, is coplanar with the lock unit, and on which a second of the two pins slides during insertion.

10 Claims, 3 Drawing Sheets

RESCUE VEHICLE

The present invention relates to a rescue vehicle.

More specifically, the present invention relates to a rescue vehicle of the type comprising a loading compartment; a first and a second lateral wall def ining said compartment, at least the first said lateral wall having a loading-unloading opening narrower than the length of said compartment and located adjacent to a first longitudinal end of the compartment; at least one stretcher set to a longitudinal transportation position inside said compartment, and movable to and from said compartment through said opening, the stretcher being narrower and longer than the width of said opening; and fastening means for releasably fixing said stretcher in said transportation position.

The present invention may be used to advantage in heliambulances, to which the following description refers purely by way of example.

BACKGROUND OF THE INVENTION

In known heliambulances of the type described above, the stretcher cannot be inserted transversely into the loading compartment on account of the lateral loading-unloading opening, as stated, being narrower than the length of the stretcher. Consequently, to set the stretcher to the longitudinal transportation position inside the loading compartment, the stretcher must be lifted by at least two bearers; at least part of the stretcher, still in the raised position, must be inserted longitudinally through the opening; and the stretcher must be turned into the longitudinal transportation position inside the compartment, and then lowered vertically and locked in the transportation position inside a seat.

SUMMARY OF THE INVENTION

It is an object of the present invention to equip the stretcher and the loading compartment in such a manner as to simplify the above operations.

According to the present invention, there is provided a rescue vehicle comprising a loading compartment; a first and a second lateral wall defining said compartment, at least the first said lateral wall having a loading-unloading opening narrower than the length of said compartment and located adjacent to a first longitudinal end of the compartment; at least one stretcher set to a longitudinal. transportation position inside said compartment, and movable to and from said compartment through said opening, the stretcher being narrower and longer than the width of said opening; and fastening means for releasably fixing said stretcher in said transportation position; characterized in that said fastening means comprise two pins projecting downwards from opposite ends of said stretcher; a first and a second seat located inside said compartment, and each for receiving a respective said pin, said first seat being adjacent to said first end and facing said opening, and said second seat being set back with respect to said opening; releasable click-on locking means associated with said first seat to lock the respective said pin inside said first seat; and transverse guide means extending from said second seat and for guiding the respective said pin along a transverse insertion path into said second seat.

BRIEF DESCRIPTION OF THE DRAWINGS

A non-limiting embodiment of the invention will be described by way of example with reference to the accompanying drawings, in which.

DETAILED DESCRIPTION OF THE INVENTION

Figure 1:
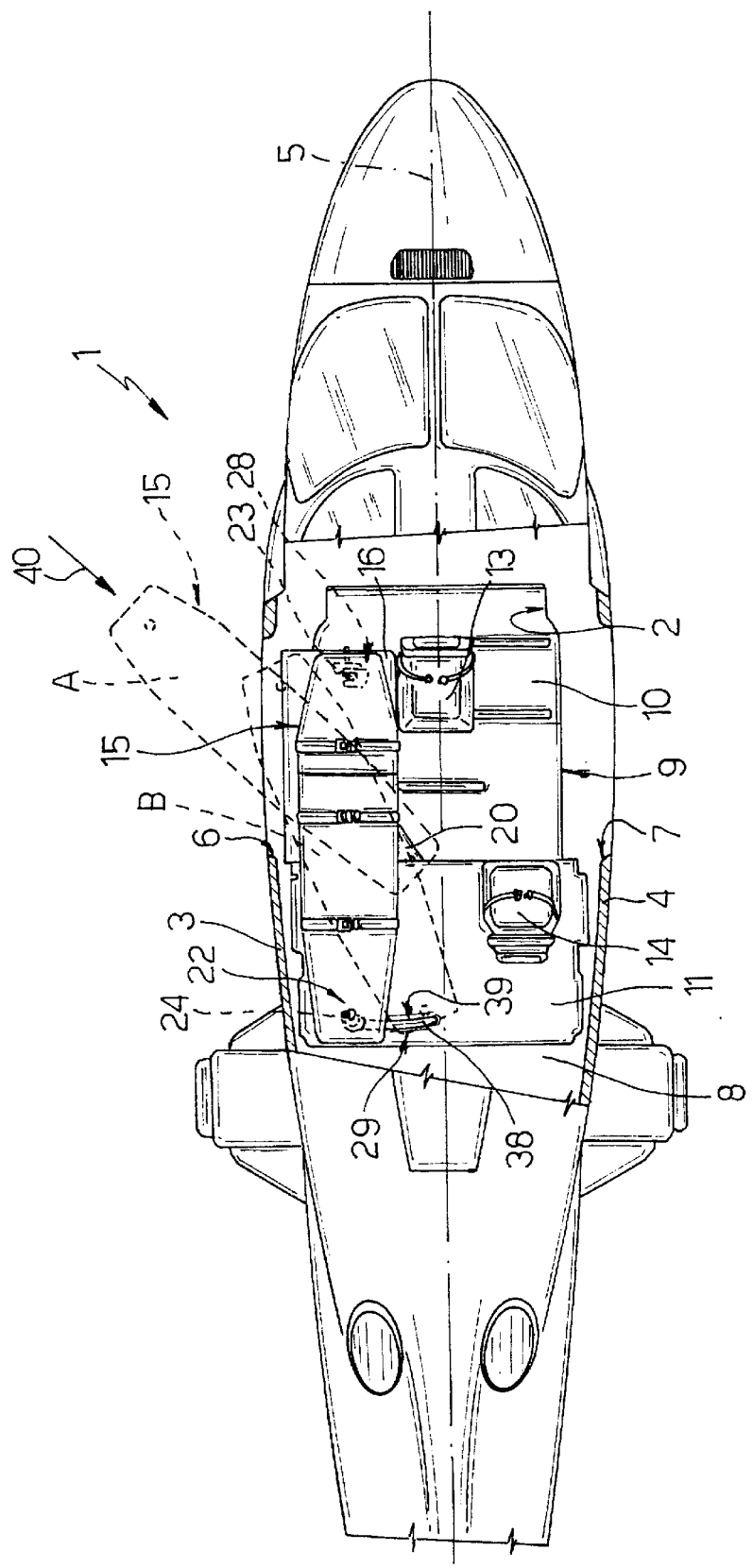
FIG. 1 shows a partly sectioned, partial plan view of a vehicle, in particular a heliambulance, in accordance with the teachings of the present invention.
Figure 2:
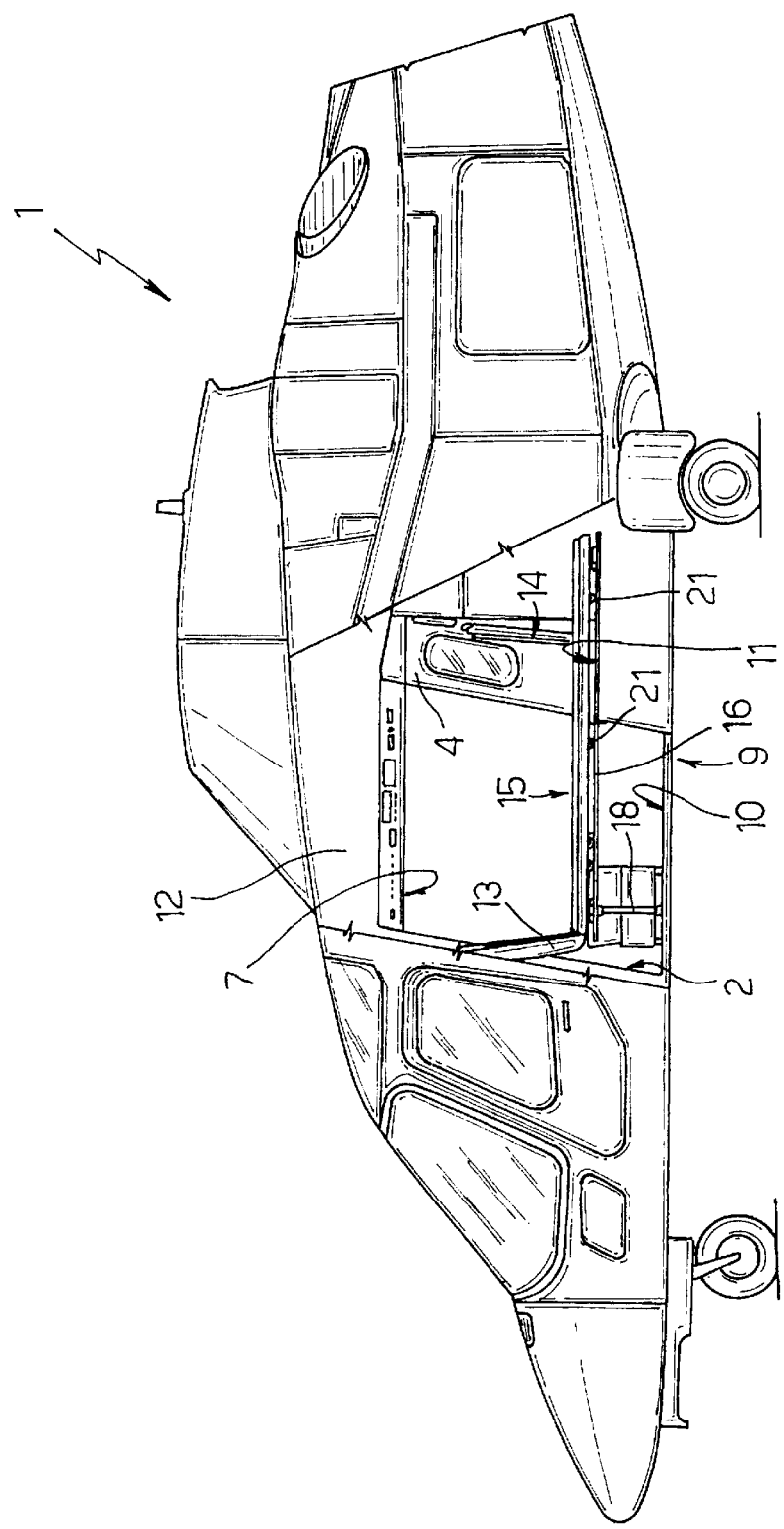
FIG. 2 shows a partly sectioned, partial side view of the FIG. 1 vehicle.

Number 1 in FIG. 1 indicates as a whole a heliambulance comprising a loading compartment 2 defined laterally by two substantially vertical lateral walls 3 and 4, which are parallel to a longitudinal axis 5 of heliambulance 1, and have respective loading-unloading openings 6 and 7, each of which is adjacent to the front end of compartment 2, is narrower than the length or longitudinal dimension of compartment 2, and is closed by a respective known sliding door (not shown).

Compartment 2 is also defined by a substantially vertical rear wall 8 crosswise to longitudinal axis 5; a bottom wall 9 comprising a front floor surface 10 and a rear surface 11, which are substantially horizontal and at different levels, with rear surface 11 at a higher level than front surface 10; and a substantially horizontal top wall 12.

In the example shown, compartment 2 is equipped with a front seat 13 supported in an adjustable position on front surface 10; a rear seat 14, the seat portion of which is formed by an end portion of rear surface 11 adjacent to lateral wall 4; and a stretcher 15 longer than the width of openings 6 and 7 and positioned, in the transportation position, parallel to longitudinal axis 5 and resting both on rear surface 11 and on a panel 16 fitted removably inside compartment 2 to the front of and coplanar with rear surface 11.

Panel 16 is substantially rectangular, and is located, inside compartment 2, adjacent to and facing opening 6, with its longitudinal axis substantially parallel to longitudinal axis 5, with a rear edge 17 connected in known manner (not shown) to a front edge of rear surface 11, and with a front end resting on front surface 10 via the interposition of an upright 18 fitted on the bottom end with a mushroom-shaped head 19 which releasably engages a known lock device (not shown) fitted to front surface 10. At rear edge 17, on the side facing opening 7, panel 16 comprises an appendix 20, the function of which is explained later on, and which is substantially triangular with its vertex facing forwards, and its base aligned with rear edge 17.

Stretcher 15 is fitted underneath with a number of castors 21 by which to run along and rest on a flat supporting surface defined by panel 16 and rear surface 11, and is locked in said transportation position by a fastening device 22 comprising two mushroom-shaped pins 23 and 24, which project downwards from a front end and rear end respectively of stretcher 15, are located along a central longitudinal axis of stretcher 15, and have respective flared heads 25 (only one shown). Fastening device 22 also comprises two seats 26 and 27 formed on panel 16 and rear surface 11 respectively, and for receiving respective pins 23 and 24; a lock unit 28 associated with seat 26 and for locking pin 23 releasably inside seat 26; and a transverse guide unit 29 associated with seat 27 and for guiding pin 24 along a transverse insertion path into seat 27.

Figure 4:
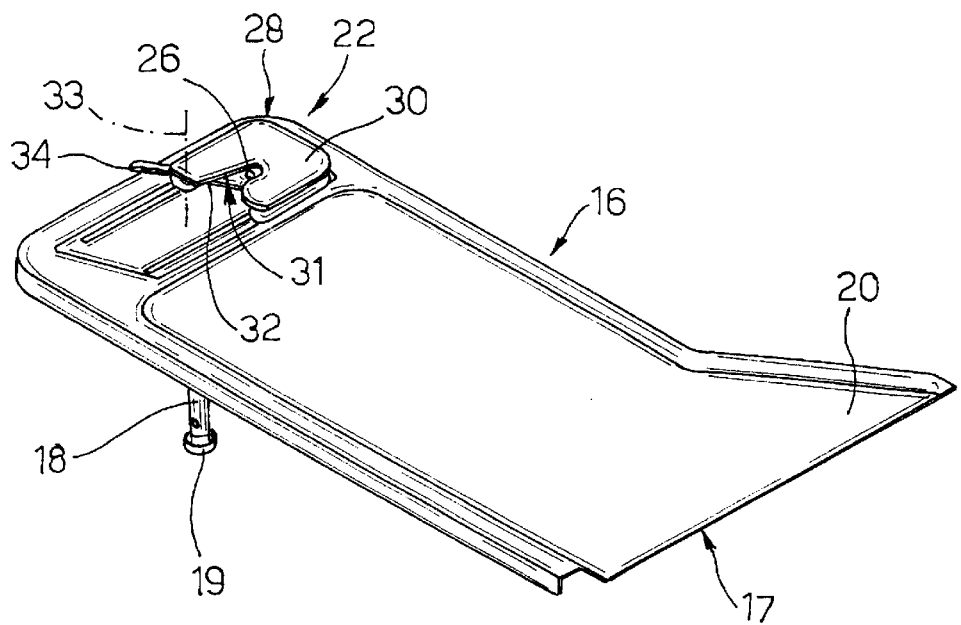
FIG. 4 shows a larger-scale view in perspective of a further detail in FIG. 1.

As shown in FIG. 4, lock unit 28, the position of which is adjustable crosswise to the longitudinal axis of panel 16, is positioned, in use, facing opening 6, and is defined by a known gripper device comprising a jaw 30 defined by a flat plate parallel to and fixed in a raised position to panel 16. Jaw 30 has a lateral slot 31 extending crosswise to the longitudinal axis of panel 16, and which is open towards opening 6 and comprises an inner end portion defining seat 26. Lock unit 28 also comprises a movable jaw 32 defined by a flat plate parallel to panel 16, and which is located beneath jaw 30 in a raised position with respect to panel 16. Jaw 32 is hinged to panel 16 to rotate (anticlockwise in FIG. 4) about an axis 33 and in opposition to a spring (not shown), so as to permit transverse insertion of pin 23 inside seat 26 (with head 25 underneath jaws 30 and 32) and lock pin 23 inside seat 26. Jaw 32 is fitted integrally with a lever 34 by which to rotate jaw 32 manually about axis 33, and in opposition to said spring (not shown), to withdraw pin 23 transversely from seat 26.

Figure 3:
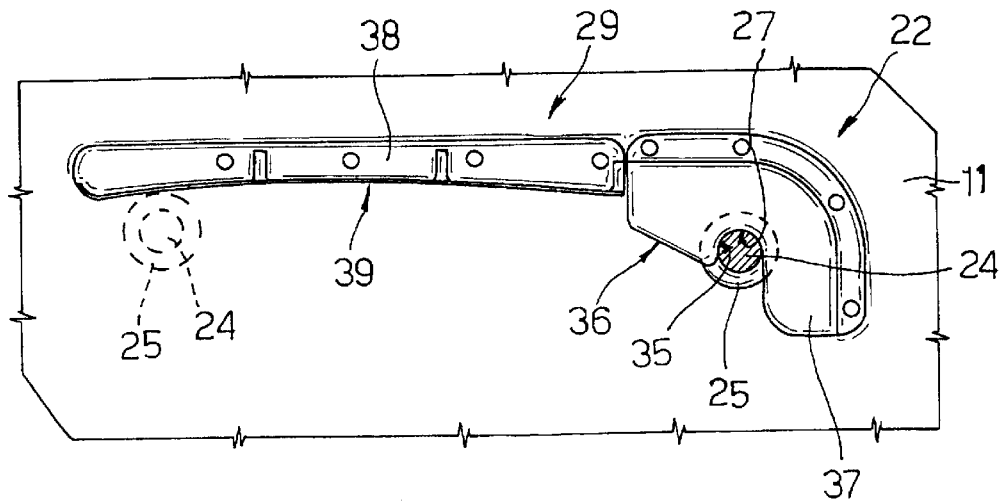
FIG. 3 shows a larger-scale view of a first detail in FIG. 1.

As shown in FIG. 3, seat 27 is defined by the inner end portion of a slot 35 formed along a sloping front edge 36 of a plate 37 parallel to and fixed to rear surface 11 in a raised position adjacent to lateral wall 3 and set back with respect to opening 6. Slot 35 is open towards lock unit 28, and guide unit 29 comprises a section 38 fixed to rear surface 11 crosswise to longitudinal axis 5. Section 38 extends from plate 37 towards opening 7, and has a curved lateral edge 39 positioned with its concavity facing lock unit 28, and preferably having a radius of curvature smaller than the length of stretcher 15. Edge 39 is set back slightly with respect to edge 36 of plate 37, and cooperates with head 25 of pin 24 to guide pin 24 along a transverse path connected to edge 36 and to the inlet of slot 35.

In actual use, stretcher 15 is inserted inside compartment 2 through opening 6, by first orienting stretcher 15 in a direction 40 sloping with respect to longitudinal axis 5 and towards longitudinal axis 5 and rear wall 8. On reaching a position A (shown by the dash line in FIG. 1), in which stretcher 15 is partly inserted through opening 6 with its rear end resting on panel 16, stretcher 15 is rotated gradually (clockwise in FIG. 1) about an instantaneous vertical axis, and at the same time is pushed axially towards rear wall 8 into a position B (also shown by the dash line in FIG. 1) in which head 25 of pin 24 contacts edge 39 of section 38. Between positions A and B, castors 21 of stretcher 15 rest first on panel 16, and then on both panel 16 and rear surface 11, and run along a path extending along appendix 20, which specifically provides for supporting part of the weight of stretcher 15, and obviously any load on it, between positions A and B.

At this point, stretcher 15 is rotated further (clockwise in FIG. 1) about an intermediate instantaneous vertical axis, so that head 25 of pin 24 slides along edge 39 of section 38 until pin 24 laterally contacts edge 36 of plate 37 and slides along edge 36 into seat 27. Once in this position, stretcher 15 is finally rotated about the axis of seat 27, so that pin 23 laterally contacts jaw 32, rotates jaw 32 anticlockwise in FIG. 4 about axis 33 to engage seat 26, and is locked inside seat 26 by jaw 32 springing back to its original position.

Stretcher 15 is withdrawn by rotating jaw 32 by means of lever 34 to release pin 23, and then performing the above steps in reverse.

As will be clear from the foregoing description, guide unit 29 provides for loading stretcher 15 must faster by enabling the bearers to accurately insert pin 24 inside seat 27; while lock unit 28 provides for clicking stretcher 15 rapidly into the transportation position by simply rotating stretcher 15 about the axis of pin 24.

In connection with the above, it should also be pointed out that removable panel 16 for supporting part of stretcher 15 also provides, if necessary, for rapidly converting loading compartment 2 for other uses.

What is claimed is:

1. A rescue vehicle (1) comprising a loading compartment (2); a first and a second lateral wall (3, 4) defining said compartment (2), at least the first said lateral wall (3) having a loading-unloading opening (6) narrower than the length of said compartment (2) and located adjacent to a first longitudinal end of the compartment (2); at least one stretcher (15) set to a longitudinal transportation position inside said compartment (2) and movable to and from said compartment (2) through said opening (6), the stretcher (15) being narrower and longer than the width of said opening (6); and fastening means (22) for releasably fixing said stretcher (15) in said transportation position; characterized in that said fastening means (22) comprise two pins (23, 24) projecting downwards from opposite ends of said stretcher (15); a first and a second seat (26, 27) located inside said compartment (2), and each for receiving a respective said pin (23, 24), said first seat (26) being adjacent to said first longitudinal end and facing said opening (6), and said second seat (27) being set back with respect to said opening (6); releasable click-on locking means (28) associated with said first seat (26) to lock the respective said pin (23) inside said first seat (26); and transverse guide means (29) extending from said second seat (27) and for guiding the respective said pin (24) along a transverse insertion path into said second seat (27).

2. A vehicle as claimed in claim 1, wherein said transverse guide means (29) are substantially coplanar with said first and second seat (26, 27), and extend from the second seat (27) towards said second lateral wall (4).

3. A vehicle as claimed in claim 1, wherein said transverse guide means (29) comprise a curved guide member (38) fitted in a fixed position inside said compartment (2), with its concavity facing said first seat (26).

4. A vehicle as claimed in claim 3, wherein said guide member (38) has a radius of curvature smaller than a distance between said two pins (23, 24).

5. A vehicle as claimed in claim 1, wherein said click-on locking means (28) comprise a gripper in turn comprising a fixed jaw (30) having a vertical lateral slot (31) open towards said opening (6) and defining said first seat (26), and a movable jaw (32) movable resiliently about a vertical axis (33) from a normal closed position to an open position opening said first seat (26), and which springs back from said open position to said closed position.

6. A vehicle as claimed in claim 1, wherein each said pin (23, 24) is substantially mushroom-shaped, and comprises a flared head (25) engaged, in use, beneath the respective said seat (26, 27).

7. A vehicle as claimed in claim 1, wherein said compartment (2) comprises a bottom wall (9) comprising a first and a second surface (10, 11) offset in height; said first surface (10) being at a lower level than said second surface (11) and extending at said opening (6); and a panel (16) being fitted removably inside said compartment (2), over said first surface (10) and coplanar with said second surface (11), to support at least part of said stretcher (15) in said transportation position.

8. A vehicle as claimed in claim 7, wherein said second seat (27) is located on said second surface (11); said locking means (28) are carried by said panel (16); and said transverse guide means (29) are carried by said second surface (11).

9. A vehicle as claimed in claim 1, wherein the vehicle itself is a heliambulance (1) comprising a nacelle enclosing said compartment (2).

10. A vehicle as claimed in claim 9, wherein said first longitudinal end is a front end of said compartment (2) in the moving direction of said heliambulance (1).

* * * * *